Feb. 23, 1943. L. FRANKEL 2,311,822
CAMERA
Filed May 7, 1941 3 Sheets-Sheet 1
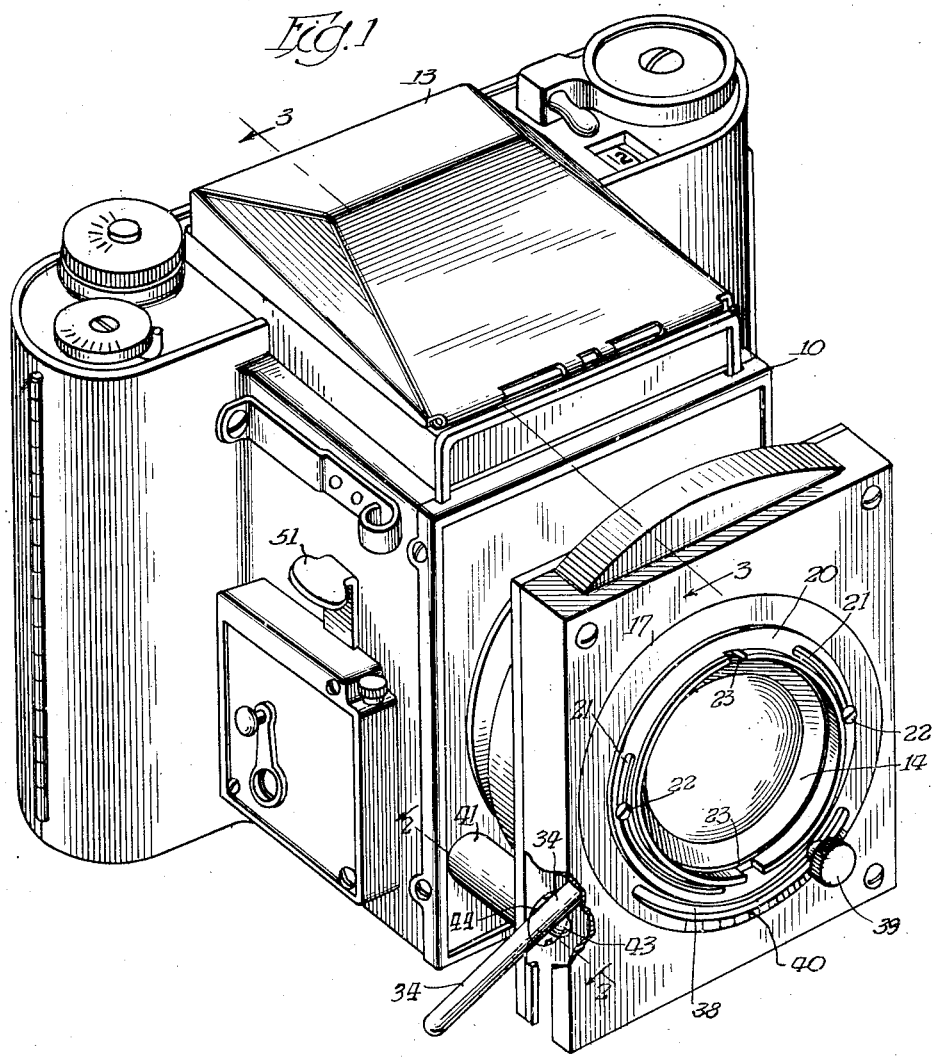
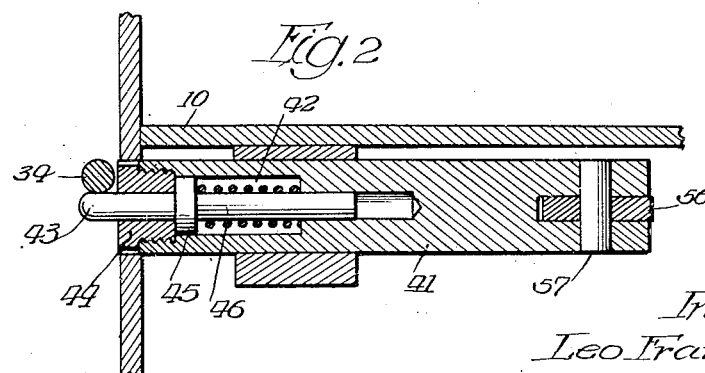
Inventor
Leo Frankel Feb. 23, 1943.   L. FRANKEL   2,311,822
CAMERA
Filed May 7, 1941   3 Sheets-Sheet 2
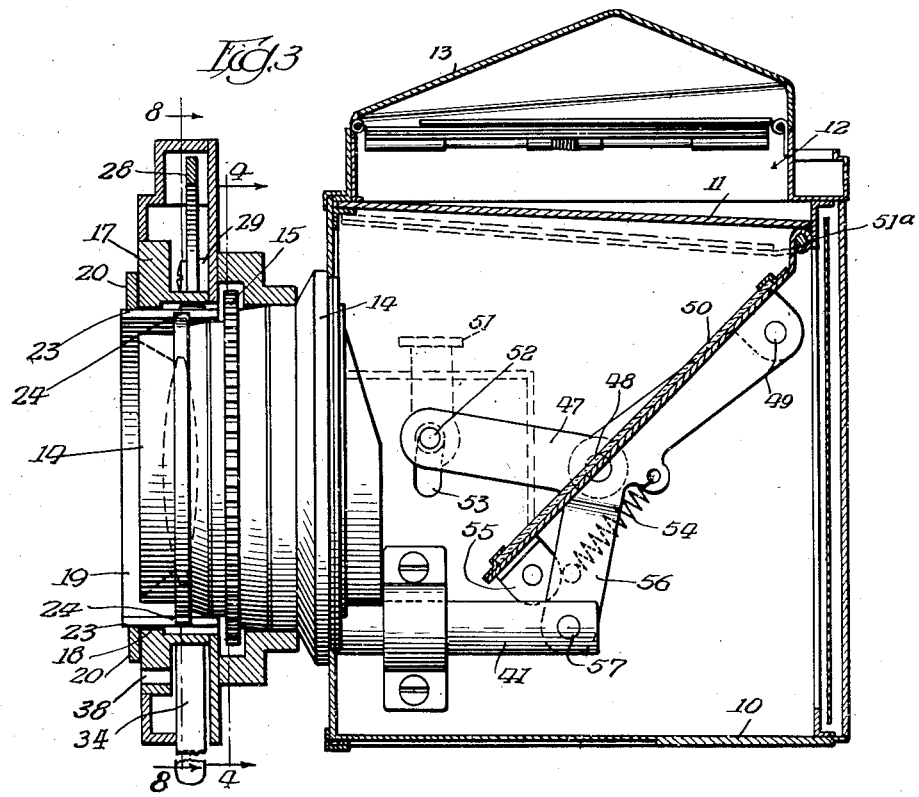
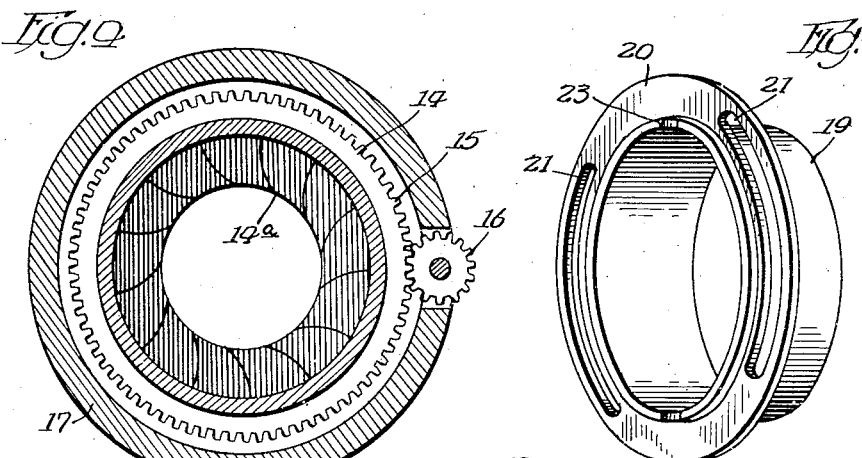
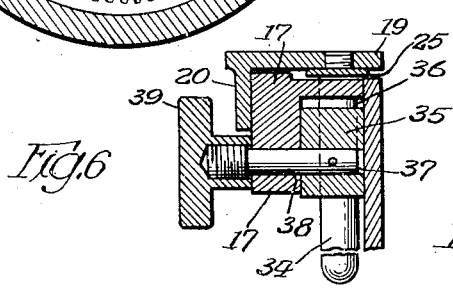
Inventor
Leo Frankel Feb. 23, 1943.  L. FRANKEL  2,311,822
CAMERA
Filed May 7, 1941  3 Sheets-Sheet 3

Inventor
Leo Frankel
By [signature] Atty.

Patented Feb. 23, 1943

2,311,822

UNITED STATES PATENT OFFICE 2,311,822

CAMERA

Leo Frankel, Chicago, Ill., assignor to Burke & James, Inc., Chicago, Ill., a corporation of Illinois Application May 7, 1941, Serial No. 392,227

3 Claims. (Cl. 95—42)

This invention relates in general to cameras and particularly to that type commonly known as a "one-eye reflex camera," that is, a camera in which the same lens will serve the purpose of both a view finder as well as for the exposure for the picture.

It is well known that with a camera of this type, empirically the operator views the picture or object through the view finder and then adjusts the opening of the lens according to the figures designated by an exposure meter, then finally viewing the object again through the view finder and then operating the shutter release button or lever during his viewing of the object.

At bright light, during the taking of certain types of pictures, it is necessary to reduce the size of the lens opening to the extent of the amount to which the light rays will be darkened. In such instances regardless of the brightness of the light, the object viewed through the view finder will appear dark. It is therefore one of the objects of the present invention to overcome these difficulties and objections and to provide improved means whereby the lens opening may be accurately adjusted before the final viewing of the object, without darkening the light necessary for the view finder.

A further object is to provide improved means for locking the lens diaphragm in an open position and improved means for releasing the diaphragm to permit it to close to the desired position.

A further object is to provide in a camera of this character improved adjustable stop means for arresting the closing movement of the diaphragm, to obtain the desired size of exposure opening, and whereby the size of the exposure opening may be varied at will.

A still further object is to provide improved means whereby after the final viewing of the object, to successively release the diaphragm to cause the same to provide the desired size of the exposure opening, and subsequently release the shutter to produce the exposure, all in one cycle of operation of the lever or button, and at the same time cause the mirror to be shifted to a position that it will be out of the way so that it will not interfere with the taking of the picture.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which Figure 1 is a perspective view of a camera of this character constructed in accordance with the principles of this invention.

Figure 2 is an enlarged detail sectional view taken on line 2—2 Figure 1.

Figure 3 is a vertical sectional view taken on line 3—3 Figure 1 with parts omitted.

Figure 4 is a detail sectional view taken on line 4—4 Figure 3 with parts omitted.

Figure 5 is a detail perspective view of one of the parts of the lens mechanism.

Figure 6 is a detail sectional view taken on line 6—6 Figure 7.

Figure 7:
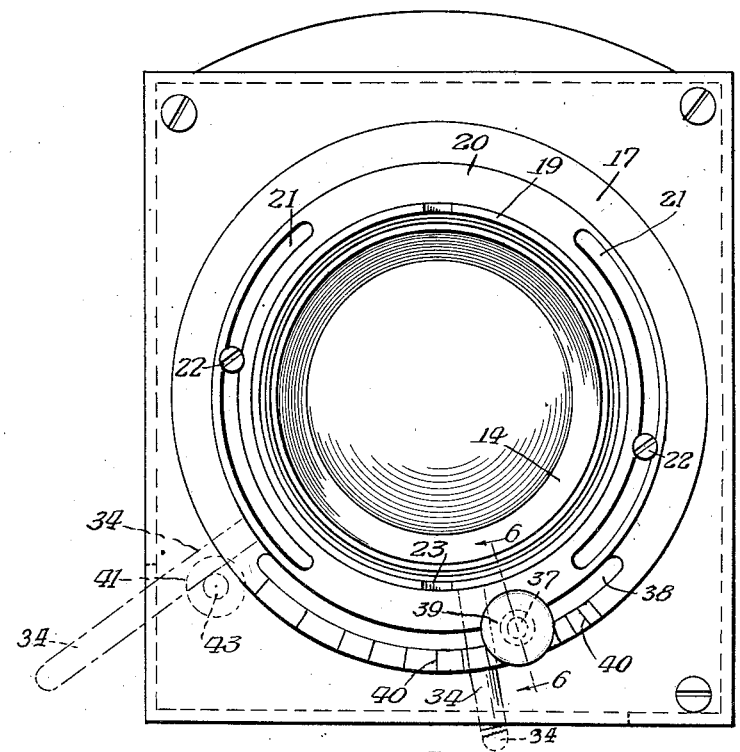
Figure 7 is a front elevation of the camera, on an enlarged scale, and with parts omitted.

Referring more particularly to the drawings, the camera consists essentially of a box or casing 10 in which the usual ground glass 11 is provided, and this glass extends across the view opening 12; and 13 designates a folding hood of any suitable construction all as usual in cameras of this character.

The numeral 14 designates a lens unit which may be of any suitable construction, the parts of which are of telescoping construction and adapted to be relatively moved axially one with respect to the other for focusing purposes and to one of which elements is connected a gear 15. Meshing with this gear 15 is a smaller gear 16 suitably arranged whereby the operator by engaging the latter with his thumb while sighting the camera, may rotate it and thereby impart a rotary movement to the gear 15, the result of which is to extend or distend the lens casing.

Supported in any suitable manner is a frame 17 having an opening 18 through which the forward end of the lens unit is adapted to move. An annular member comprising a collar 19 having a radial flange 20 is seated in the opening 18 and is held in position in any desired or suitable manner, the flange 20 being provided with slots 21 through which screws 22 pass, to engage the frame to permit of an axial rotation of the collar 19.

The collar 19 is provided with any desired or suitable number of grooves 23 into which projections 24 on the diaphragm element of the lens project, and these slots permit of a longitudinal adjustment of the diaphragm element of the lens when the gear 15 is rotated.

The collar 19 and the flange 20 being rotatably supported by the frame 17 and as the diaphragm element 14a of the lens is connected with the collar 19 through the medium of the projections 24 in the slots 23, it will be manifest that upon rotation of the collar 19 the diaphragm of the lens will be operated to open and close the diaphragm according to the direction of rotation of the collar 19.

Any suitable means may be provided for rotating the collar 19 in one direction, such as a flexible member 25 (see particularly Figure 8) one end of which is anchored, as at 26, to the collar 19 and the other end is connected, as at 27, to a lever 28, the latter being pivotally mounted intermediate its ends, as at 29.

To the other end 30 of the lever is connected, as at 31, one end of a coil spring 32. The other end of the spring is anchored, as at 33, to a fixed support.

The spring 32 tends normally to move or rotate the collar 19 in one direction by swinging the lever 28 about its pivot 29 to draw upon the flexible member 25. The rotation of the collar 19 in this direction is arrested by means of a pin 34 connected to the collar and which pin is adapted to engage a stop 35. The stop 35 may be of any suitable construction but preferably embodies a body portion movable in a space 36 in the frame, and connected to the stop 35 is a pin 37 which extends through a slot 38 in the frame 17, a thumb nut or collar 39 being adjustably secured to the free end of the pin 37.

By loosening the nut or collar 39 the stop 35 may be adjusted to any suitable position with respect to graduations 40 on the face of the member 17 and when in the desired position may be held against further adjustment by tightening the nut or collar 39.

Therefore, it will be manifest that this stop 35 may be moved to any desired position so that when the collar 19 is rotated by the spring 32, lever 28 and flexible member 25, the extent of rotation thereof will be determined by the position of the stop 35 to be engaged by the pin 34.

Mounted upon the frame work of the camera and in any suitable position is a locking pin for locking the member 19 against rotation and for holding it against the stress of the spring 32. This locking pin may be of any desired or suitable construction but preferably comprises a body portion 41 which is preferably recessed at its forward end, as at 42. A pin 43 extends through an adjustable collar or nut 44 secured to the end of the member 41 to close the recess 42 and a shoulder 45 on the pin 43 is adapted to abut the collar 44 to arrest the outward movement of the pin with respect to the member 41.

A coil spring 46 is arranged within the recess 42 and one end thereof engages the collar 45 while the other end engages the bottom of the recess 42, the spring 46 tending normally to project the pin 43 beyond the end of the member 41, thereby providing a yieldable locking pin. This pin 43 is arranged in a position (see particularly Figures 1 and 8) that when the diaphragm is in a fully open position, to engage behind the pin 34 as indicated in dotted lines in Figure 8.

Figure 8:
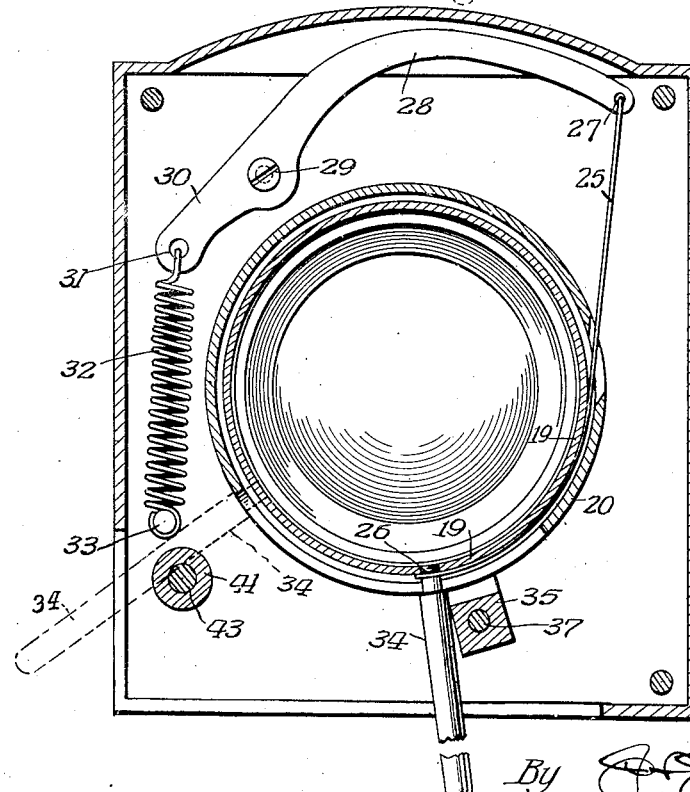
Figure 8 is an enlarged detail sectional view taken on line 8—8 Figure 3, with parts omitted.

Assuming the parts to be in the position as shown in full lines in Figure 8, when it is desired to open the diaphragm the end of the pin 34 may be engaged by the finger of the operator and the collar 19 rotated until the pin 34 engages the pin 43, whereupon the latter will yield so as to permit the pin 34 to pass after which the spring 46 will then project the pin 43 and move it into the path of the return movement of the pin 34, thereby locking the diaphragm in an open position, as shown clearly in Figure 1.

Arranged within the camera body is a tripping mechanism which may be of any suitable construction but preferably embodies a bell crank lever 47 pivotally mounted, as at 48. One end of the bell crank lever is connected, as at 49, to a mirror 50 which is pivotally mounted, as at 51ª, and to the other end of the lever is connected an operating slide or button 51 which is disposed on the outside of the camera box as shown more clearly in Figure 1, and is connected to the lever 47 by means of a pivot pin 52 that extends through a slot 53 in the wall of the camera. By the operation of this button 51, the mirror 50 may be swung in one direction about its pivot against the stress of a spring 54 and by a further operation of the slide or button 51 the camera shutter will be operated in a manner well known in this art, the movement of the mirror 50 in one direction being arrested by means of a suitable stop 55.

The bell crank lever is connected by means of an arm 56 to one end of the member 41 carrying the locking pin 43, in any suitable manner, such as by means of a pivot pin 57 so that upon movement of the slide or button 51 to operate the lever 47 the member 41 will be retracted and with it the locking pin 43, thereby releasing the pin 34 so that the member 19 may be rotated under the stress of the spring 32 through the operation of the lever 28 and the flexible member 25, the rotation of the member 19 being arrested, as before indicated, by the stop 35.

It will therefore be manifest that the position of the stop 35 will control the extent to which the diaphragm will close and therefore the size of the lens opening for the taking of the picture.

Therefore by adjusting the position of this stop 35 it will be manifest that the size of the lens opening may be varied at will.

It is thought that the operation of this mechanism will be clearly understood from the foregoing, but briefly stated it is as follows:

The first step in the taking of a picture with this attachment is to open the diaphragm to the fullest extent by rotating the collar or member 19 through the medium of the pin 34 until the pin 34 passes behind the locking pin 43. The lens then will operate as a view finder because the mirror 50 will assume the position shown in Figure 3, the view being reflected by the mirror through the glass 11 to the eye of the operator.

After the object has been viewed an exposure meter is employed for measuring the light rays. With this information the operator then adjusts the stop 35 according to the graduations 40 and while the lens diaphragm is open.

The object is then again viewed through the lens which still operates as a view finder.

The slide or button 51 is then operated and during the first or initial portion of the operation thereof and up to the instant just before the exposure is to be made, that is, just before the camera shutter is operated, the mirror 50 will be swung to the position shown in dotted lines in Figure 3 and the locking pin 43 will be withdrawn so as to release the pin 34. At this instant the stress of the spring 32 will swing the lever 28 about its pivot 29 and through the medium of the flexible member 25 the diaphragm operating collar or member 19 will be rotated moving the diaphragm from its full open position toward the closing position. This movement of the diaphragm, however, is arrested as is also the rotation of the diaphragm member or collar 19 by the engagement of the pin 34 with the stop 35 so that the lens opening will be of the proper size. Immediately upon the engagement of the pin 34 with the stop 35 and upon a further movement of the slide or button 51 in the same direction, the camera shutter will be operated and the exposure will be made.

The camera is then reset for another exposure by moving the pin 34 back to the position shown in dotted lines in Figure 8, that is, to the position where it will engage and pass the locking pin 43 so as to permit the pin 43 to assume a position in the path of the return movement of the pin 34 and this will lock the diaphragm in a full open position.

With this improved construction it will be manifest that it is possible to maintain the diaphragm at a full open position so as to procure the proper light up to the time just before the camera shutter is actuated to take the picture, and furthermore with this invention the lens opening may be accurately adjusted before the last viewing of the object without darkening the light necessary for the view finder.

While the preferred form of the invention has been herein shown and described, it is to be understood that various changes may be made in the details of construction and in the combination and arrangement of the several parts, within the scope of the claims without departing from the spirit of this invention.

What is claimed as new is:

1. Means for accurately adjusting the lens opening before final viewing of the object without reducing the light necessary for the view finder, including in combination a main camera casing, a view finder, a rotatable diaphragm actuating member, means tending normally to move the said member in one direction to close the diaphragm, locking means for locking the diaphragm in open position to provide maximum light for the view finder, means for rendering said locking means inactive whereby to permit the diaphragm to move in a closing direction subsequent to the locating of the view, an adjustable stop device for arresting the diaphragm in its closing movement, whereby to provide an exposure opening of a predetermined size, the said locking means embodying a support, a spring pressed locking element mounted upon the support for movement therewith and with respect thereto, said element operating in a plane transverse to the plane of movement of said diaphragm actuating member, a projection on the said rotatable member to engage said element to depress the latter with respect to the support and to pass therebehind, and an operating element for shifting said support and said element to render said locking means ineffective.

2. Means for accurately adjusting the lens opening before final viewing of the object without reducing the light necessary for focusing the view, including in combination a main camera casing, a lens opening, means for holding a sensitized element in alinement with said lens opening, a rotatable diaphragm actuating member, a shutter, a mirror movable into focusing position between said lens opening and said sensitized element and out of such position, means tending normally to move the said actuating member in one direction to close the diaphragm, locking means for locking the diaphragm in open position to provide maximum light for focusing, means operatively related to and operating to successively render said locking means inactive, move said mirror out of focusing position with relation to the lens opening, close said diaphragm and render said shutter active, and an adjustable stop device for arresting the diaphragm in its closing movement, whereby to provide an exposure opening of a pre-determined size previous to the actuation of said shutter, the said means which tends normally to move the said rotatable member in one direction embodying a lever, a flexible member forming a connection between the lever and the said rotatable member, and resilient means tending normally to move the lever in one direction.

3. Means for accurately adjusting the lens opening before final viewing of the object without reducing the light necessary for focusing the view, including in combination a main camera casing, a lens opening, means for holding a sensitized element in alinement with said lens opening, a rotatable diaphragm actuating member, a shutter, a mirror movable into focusing position between said lens opening and said sensitized element and out of such position, means tending normally to move the said actuating member in one direction to close the diaphragm, locking means for locking the diaphragm in open position to provide maximum light for focusing, means operatively related to and operating to successively render said locking means inactive, move said mirror out of focusing position with relation to the lens opening, close said diaphragm and render said shutter active, and an adjustable stop device for arresting the diaphragm in its closing movement, whereby to provide an exposure opening of a pre-determined size previous to the actuation of said shutter, the said locking means embodying a support, a spring-pressed locking element mounted upon the support for movement therewith and with respect thereto, a projection on the said rotatable member to engage said element to depress the latter with respect to the support and to pass therebehind, and an operating element for shifting said support and said element to render said locking means ineffective.

LEO FRANKEL.